US012704845B2

(12) United States Patent
McNealy et al.

(10) Patent No.: US 12,704,845 B2
(45) Date of Patent: Aug. 11, 2026

(54) DYNAMIC WORKSITE MANAGEMENT SYSTEM

(71) Applicant: Caterpillar Inc., Peoria, IL (US)

(72) Inventors: Anthony Dean McNealy, Dunlap, IL (US); Russell Aaron Schloss, Pittsburgh, PA (US); Carsten Thees, Sewickley, PA (US); Robert Jason McGee, Clayton, NC (US)

(73) Assignee: Caterpillar Inc., Peoria, IL (US)

( * ) Notice: Subject to any disclaimer, the term of this patent is extended or adjusted under 35 U.S.C. 154(b) by 189 days.

(21) Appl. No.: 18/510,785

(22) Filed: Nov. 16, 2023

(65) Prior Publication Data

US 2025/0164992 A1 May 22, 2025

(51) Int. Cl.
*G05D 1/00* (2024.01)

(52) U.S. Cl.
CPC ......... *G05D 1/0282* (2013.01); *G05D 1/0289* (2013.01); *G05D 1/0297* (2013.01)

(58) Field of Classification Search
CPC .. G05D 1/0282; G05D 1/0289; G05D 1/0297; G05D 1/02
USPC .............................................................. 701/2
See application file for complete search history.

(56) References Cited

U.S. PATENT DOCUMENTS

| | | | | |
|---|---|---|---|---|
| 6,266,537 B1 * | 7/2001 | Kashitani | .............. | H04W 74/06 455/422.1 |
| 2008/0077299 A1 * | 3/2008 | Arshad | .................. | E02F 9/003 701/50 |
| 2014/0136020 A1 * | 5/2014 | Halder | ................. | G05D 1/0276 701/1 |
| 2022/0187823 A1 * | 6/2022 | Ramasamy | ........... | B60W 30/09 |
| 2022/0333346 A1 * | 10/2022 | Mizuochi | .............. | H04W 4/029 |

FOREIGN PATENT DOCUMENTS

| | | | |
|---|---|---|---|
| CN | 112459143 A | 3/2021 | |
| CN | 114584925 A | 6/2022 | |
| WO | WO-2022155540 A1 * | 7/2022 | ......... G05B 19/4155 |
| WO | WO-2024191869 A1 * | 9/2024 | ......... G05B 19/4185 |

* cited by examiner

*Primary Examiner* — Kenneth M Dunne
*Assistant Examiner* — Brian K Palmarchuk

(57) ABSTRACT

A node monitoring system, including a plurality of nodes, each of the plurality of nodes registered and connected with a controller to simultaneously receive and return a short poll signal and a long poll signal; and a controller configured to: register an area as an operation zone having a boundary; simultaneously send and receive a short poll signal and a long poll signal to and from each of the plurality of nodes; command at least one of the plurality of nodes to power off in response to a failure to receive the short poll signal from the at least one of the plurality of nodes; alert others of the plurality of nodes that the at least one of the plurality of nodes is operating outside of a spatial boundary.

7 Claims, 4 Drawing Sheets

DYNAMIC WORKSITE MANAGEMENT SYSTEM

TECHNICAL FIELD

The present disclosure generally relates to work machines, and more specifically systems for managing a fleet of work machines.

BACKGROUND

Mobile work machines may be used in the heavy industries such as mining, construction, and the like to transport materials and personnel. These work machines are often large in size, and may require an operator, e.g., a driver, to manually operate the machine in order for the machine to perform its designated/intended operations.

Typically, work sites may utilize a fleet of various mobile work machines, as well as workers performing a wide variety of jobs. It is critical on these work sites to have accurate positioning and awareness systems for collision avoidance, path planning, and site management. These systems may include positioning systems associated with each machine and person at a work site, that further include communications devices that generate a series of repeating signals (a "heartbeat") for confirmation that communications are working and position information is accurate.

As work machines are often very large in size and have the capability of causing large amounts of damage, these work machines are often equipped with emergency stops to immediately shut down the work machine. These emergency stops ("E-Stops") are usually placed at a ground level to be accessible by job site workers, and have usage directives governed by the International Organization for Standards (ISO).

Existing site safety systems may rely on either a single pre-configured heartbeat between statically registered devices or requires zonal based configuration where a site is managing safety devices within a specified static zone. Both of these approaches may be prone to mistake in dynamically changing environments that are found in Construction and Mining spaces. The larger the site becomes, the harder it is to manage the connectivity between registered devices at a single heartbeat rate, especially if they are moving long distances away from each other during the course of a work cycle. Long timeframe failure modes such as batteries getting low and then failing, machines entering brief periods of disconnectivity, and other potential failure modes can create unnecessary site shutdowns.

In light of the aforementioned shortcomings, there remains a need for a positioning system with nodes that can provide both long range and short range signals depending on the geospatial position of each node and its proximity or association with a collection of nodes. There also remains a need for a positioning system for managing a fleet of work machines to control E-Stops for work machines across large work sites.

SUMMARY OF THE DISCLOSURE

In accordance with one aspect of the disclosure, a work machine may be provided. The work machine may include a frame, a power source supported by the frame, and a control module configured to control operation of the vehicle and interact with a node monitoring system having a controller. The controller may be configured to register the work machine as a short poll node with the controller, the controller configured to send a short poll signal to a plurality of short poll nodes. The controller may also be configured to register the work machine as a long poll node with the controller, the controller configured to send a short poll signal to a plurality of long poll nodes. The controller may also be configured to send the short poll signal to the control module of the work machine and shut down the power source if the short poll signal is not returned. The controller may also be configured to simultaneously send the long poll signal to the control module of the work machine and alert nearby ones of the plurality of long poll nodes if the long poll signal is not returned.

In accordance with another aspect of the disclosure, a node monitoring system may be provided. The node monitoring system may include a plurality of nodes, each of the plurality of nodes registered and connected with a controller to simultaneously receive and return a short poll signal and a long poll signal, and a controller. The controller may be configured to register an area as an operation zone having a boundary, and simultaneously send and receive a short poll signal and a long poll signal to and from each of the plurality of nodes. The controller may also be configured to command at least one of the plurality of nodes to power off in response to a failure to receive the short poll signal from the at least one of the plurality of nodes. The controller may also be configured to alert others of the plurality of nodes that the at least one of the plurality of nodes is operating outside of a spatial boundary.

In accordance with yet another aspect of the disclosure, a method for monitoring a work site may be provided. The work site may have a plurality of work machines, a plurality of equipment, and a plurality of workers forming a plurality of nodes. The method may include determining a boundary for an area in which each of the plurality of nodes may travel. The method may include determining an allowable proximity between each of the plurality of nodes. The method may include determining a position of each of the plurality of nodes, and reporting the position of each of the plurality of nodes to a controller. Determining the position of each of the plurality of nodes may include registering each of the plurality of nodes with a short poll signal, the short poll signal being sent out to each of the plurality of nodes to determine an instantaneous position. Determining the position of each of the plurality of nodes may also include registering each of the plurality of nodes with a long poll signal, the long poll signal being sent out to each of the plurality of nodes to determine if any of the plurality of nodes are operating outside of the boundary. The method may also include shutting down at least one of the plurality of nodes, after determining that one of the plurality of nodes has not returned the short poll signal. The method may also include determining that one of the plurality of nodes is operating outside of the boundary, and alerting nearby nodes.

These and other aspects and features of the present disclosure will be more readily understood when read in conjunction with the accompanying drawings.

DETAILED DESCRIPTION

Figure 1:
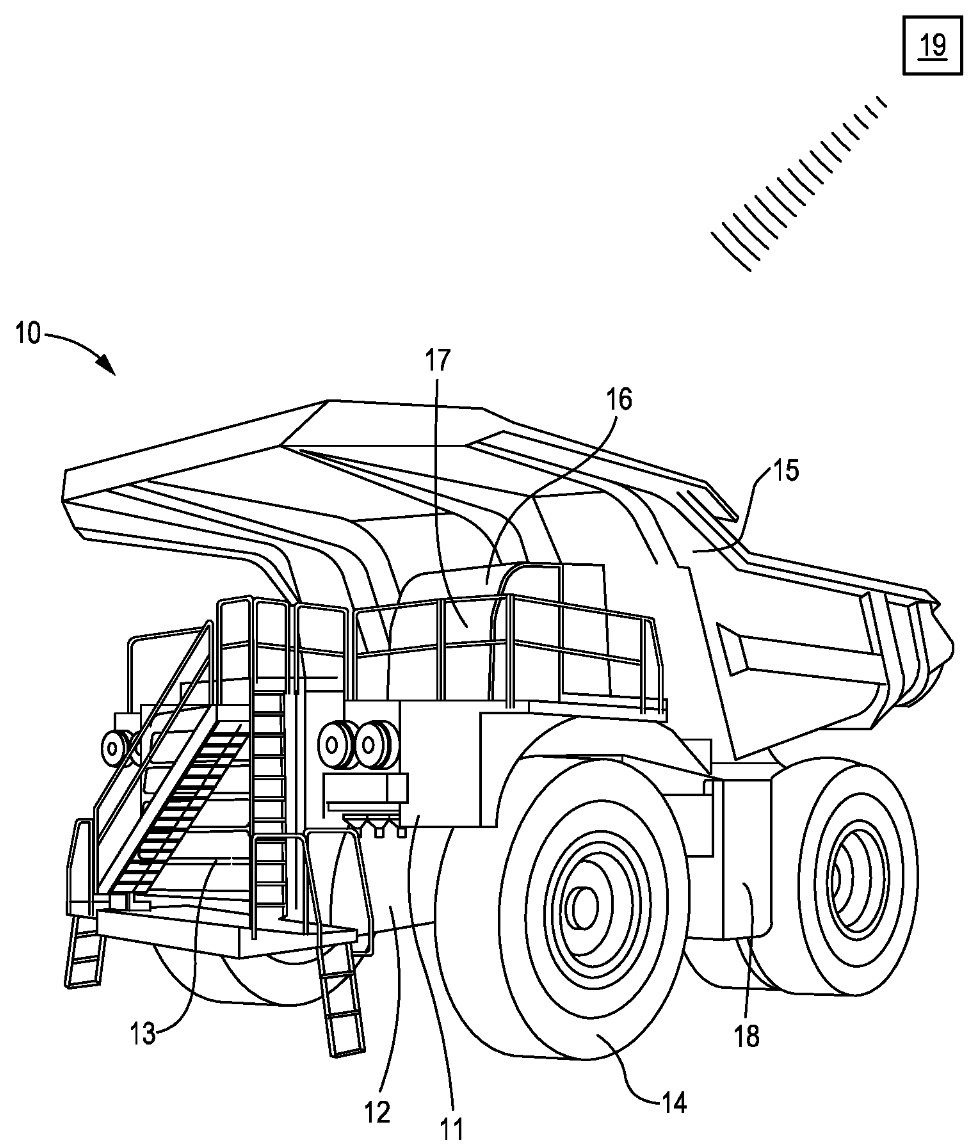
FIG. 1 is a perspective view of a work machine constructed in accordance with an embodiment of the present disclosure.

Referring now to the drawings, and with specific reference to FIG. 1, a work machine is depicted and generally referred to using reference numeral 10. The work machine 10 is exemplarily embodied in the form of a mining truck. While the work machine 10 is depicted as a mining truck, it should be noted that a type of machine used is merely exemplary and illustrative in nature. It will be acknowledged that the teachings of the present disclosure can be similarly applied to other types of work machines including but not limited to automobiles, on and off highway trucks, excavators, track-type tractors, factory robotics, and other types of machines as known to person skilled in the art.

Work machines are heavy machinery which may be configured to perform a variety of tasks. The exemplary work machine 10 is supported by a frame 11. The work machine 10 may include a drivetrain 12 powered by an engine 13 and driving ground-engaging members 14 contacting the ground and supporting the frame 11 in order to operate the work machine 10. The work machine 10 may also include an implement 15 to perform a work job. In the view of FIG. 1, since the work machine 10 is a mining truck, the implement 15 is exemplarily depicted as a dump body, but with other machines the implement may be other types of work implements known to persons skilled in the art. The work machine 10 may also include an operator cabin 16 for an operator to control the operation of the work machine 10. The operator cabin 16 may include a control module 17 for the operator to use to direct the work machine 10.

As the work machine 10 may be very large, an emergency stop 18 may be provided on the exterior of the work machine 10. The emergency stop 18 may be located proximate to a ground level such that an operator or a work site worker may easily access the emergency stop 18. The emergency stop 18 may take the form of a switch, button, lever, or other triggering devices as known, and may disconnect electric power within the work machine 10 such that all systems on the work machine 10 including the engine 13 are shut down.

While the work machine 10 of FIG. 1 is depicted as manually operated by an operator, including an operator cabin 16 to house the operator, the work machine 10 may take other forms. The work machine 10 may be remote controlled, and the operator may sit at a location remote from the work machine 10. The remote operator may have a remote controller that interfaces with the control module 17, and may include a secondary emergency stop 19 proximate to the remote operator that also may disconnect electric power to the work machine 10.

The work machine 10 may also be fully autonomous. An autonomous work machine 10 may provide a number of benefits for automating simple, repetitive tasks at a work site. The work machine 10 may be capable of autonomously navigating around work sites and performing one or more tasks with little or no intervention by an operator. Workers may be remotely located from the work machine 10 and may be able to monitor multiple autonomous machines at the same time. Remote workers monitoring the autonomous machines may also have the secondary emergency stop 19 proximate to the remote operator that also may disconnect electric power to the work machine 10.

Figure 2:
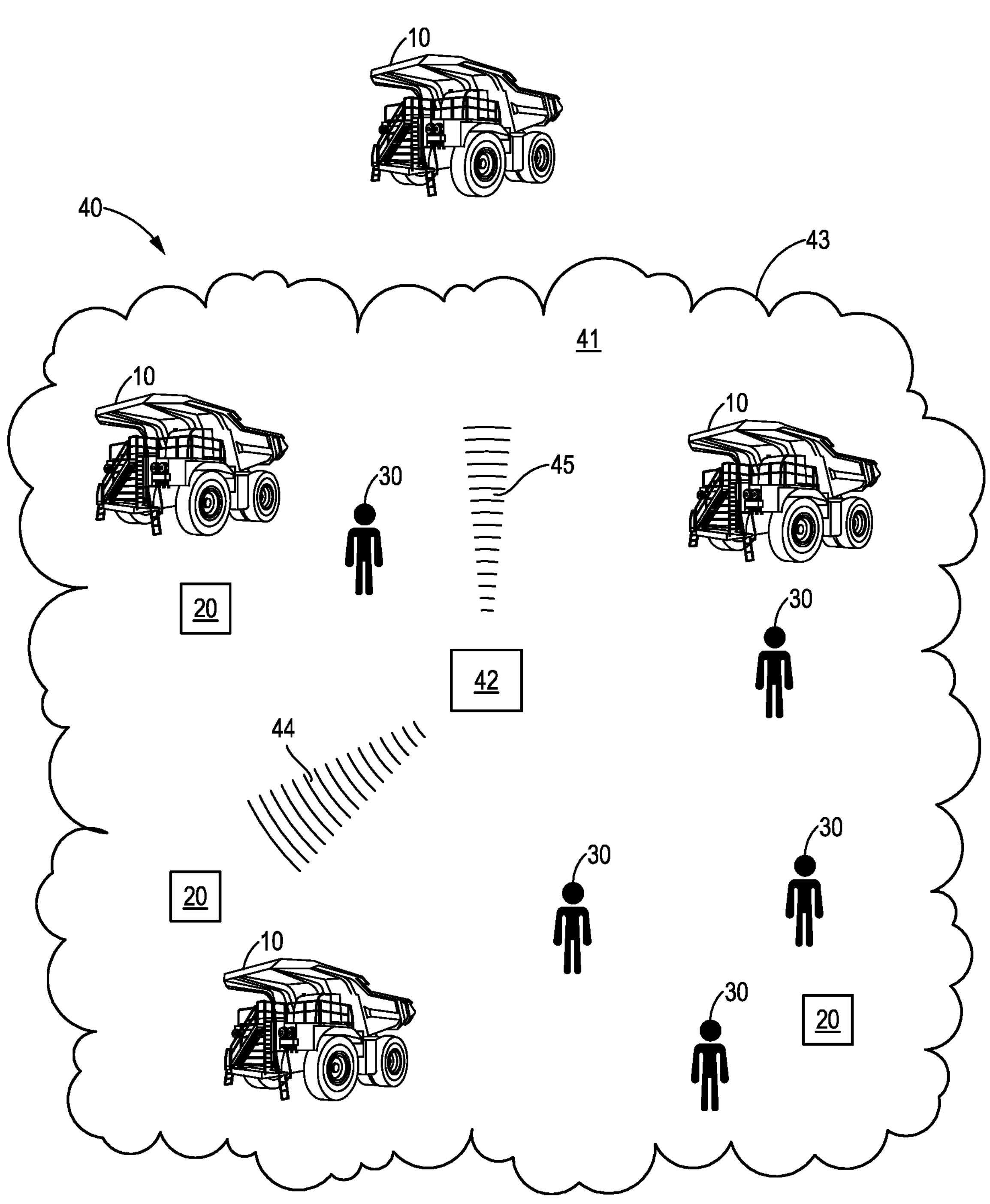
FIG. 2 is a schematic diagram depicting a node monitoring system in accordance with an embodiment of the present disclosure.
Figure 3:
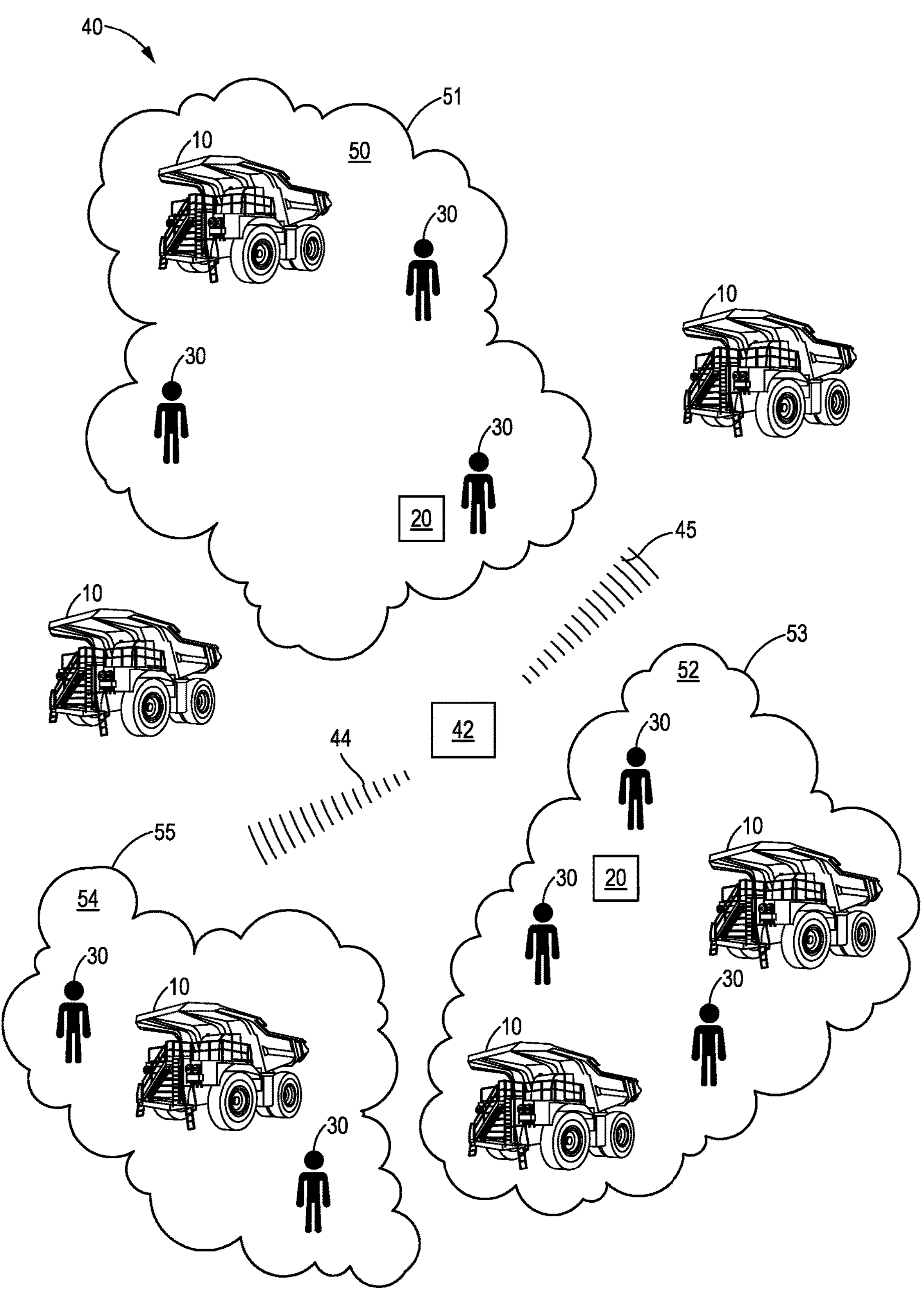
FIG. 3 is a schematic diagram depicting a node monitoring system in accordance with another embodiment of the present disclosure.

As the work machine 10 may be an incredibly large moving object, it is important to monitor the position of the work machine 10 and the interaction of the work machine 10 in proximity with other worksite equipment and workers. FIGS. 2-3 illustrate a node monitoring system 40 for monitoring and tracking objects within a fixed space. While FIGS. 2-3 depict the node monitoring system 40 implemented on a work site, the node monitoring system 40 may be implemented in many other fleet management and tracking systems, including factory machine and robotics, as known.

FIG. 2 illustrates a schematic of a work site implementing the node monitoring system 40, which may include a controller 42 to operate the node monitoring system 40. The controller 42 may determine an operation zone 41 within a specific area of the work site. The operation zone 41 may include a boundary 43 that may clearly define the limits of the operation zone 41. As shown by FIG. 2, the controller 42 may sit within the operation zone 41. The controller 42 may sit within a work site office and may include controls for an operator to operate the controller 42, including the secondary emergency stop 19.

Within the work site, the node monitoring system 40 may track a plurality of nodes. The plurality of nodes may be formed by a wide variety of objects, such as a work machines 10, work site equipment 20, and a worker 30, among others. Each of the plurality of nodes may be provided with a transponder device that may be configured to receive a signal from the controller 42 and transmit the signal back. The control module 17 of the work machine 10 may be configured to receive and return the signals. The work site equipment 20 and the worker 30 may each be equipped with a portable transponder to send and receive these signals.

In order to dynamically monitor the work site, the controller 42 may transmit a variety of signals to the work machine 10, the work site equipment 20, and the worker 30. This signal may be a periodic signal generated by the controller 42 that looks for a response signal from the work machine 10, the work site equipment 20, and the worker 30, known as a "heartbeat" signal. The controller 42 may simultaneously send two forms of a heartbeat signal, a short poll signal 44, and a long poll signal 45.

In the short poll signal 44, the controller 42 requests a return signal from the node and the node will return the response if it is available, in the case of the work site, where the work machine 10, the work site equipment 20, and the worker 30 are within the boundary 43 of the operation zone 41.

The controller 42 may set conditions for what information the heartbeat signal contains and may further set parameters for positive return signaling from the nodes. In the example of FIG. 2, the heartbeat signal is utilized to determine the spatial positioning of the work machine 10, the work site equipment 20, and the worker 30. The controller 42 may set parameters such that the work machine 10, the work site equipment 20, and the worker 30 may operate only within the operation zone 41, while maintaining a set distance away from any others of the work machine 10, the work site equipment 20, and the worker 30. The controller 42 may also be configured to dynamically adjust these parameters as the requirements of the work site dictate.

The controller 42 may be configured to trigger an emergency stop in any of the work machine 10, the work site equipment 20, and the worker 30. If the controller 42 determines that any two or more of the work machine 10, the work site equipment 20, and the worker 30 are in a closer proximity as specified in parameters defined by the controller 42, the controller 42 may trigger the emergency stop of any number of the nodes. The controller 42 may also be configured to trigger the emergency stop of a nodes if it is detected to be operating outside of the operation zone 41. While each of the work machine 10 and the work site equipment 20, may be equipped with an emergency stop to shut off power, the worker 30 does not have an emergency stop. Each transponder of the work machine 10, the work site equipment 20, and the worker 30 may therefore include warning lights, buzzers, or any other warning signals as known to provide additional alerts.

In the long poll signal 45, the controller 42 requests a return signal from the node and if the return signal is not available then the node will hold the request until the return signal gets available, and then send the response back.

The long poll signal 45 is advantageously used in the example of the work site as shown by FIG. 3. In the node monitoring system 40 of FIG. 3, the controller 42 may determine multiple operation zones within the work site. As depicted in FIG. 3, a first operation zone 50 having a first boundary 51, a second operation zone 52 having a second boundary 53, and a third operation zone 54 having a third boundary 55. Within each of the first operation zone 50, the second operation zone 52, and the third operation zone 54, any number of the work machine 10, the work site equipment 20, and the worker 30 may be specified to operate by the controller 42. In the example of FIG. 3, the controller 42 may not sit within any of these operation zones. The controller 42 sends the short poll signal 44 to all of the work machine 10, the work site equipment 20, and the worker 30 to monitor operation within the first operation zone 50, the second operation zone 52, and the third operation zone 54. However, normal operations of the work site may require a certain number of nodes to move between the operation zones.

In the depiction of FIG. 3, several of the work machine 10 are shown to be travelling between the operation zones. The controller 42 sends the long poll signal 45 to the work machine 10 and the work machine 10 stores the response signal until the work machine 10 has arrived at the destination operation zone. The controller 42 may send an alert to of any other of the work machine 10, the work site equipment 20, and the worker 30 that are in proximity to the work machine 10 that is travelling between operation zones.

INDUSTRIAL APPLICABILITY

In operation, the teachings of the present disclosure can find applicability in many industries including but not limited to work machines used in the earth moving, mining, agricultural, and construction industries. While depicted and described in conjunction with a mining machine, such teachings can also find applicability with other machines such as automobiles, on and off highway trucks, excavators, track-type tractors, factory robotics, and other types of machines as known to person skilled in the art.

Figure 4:
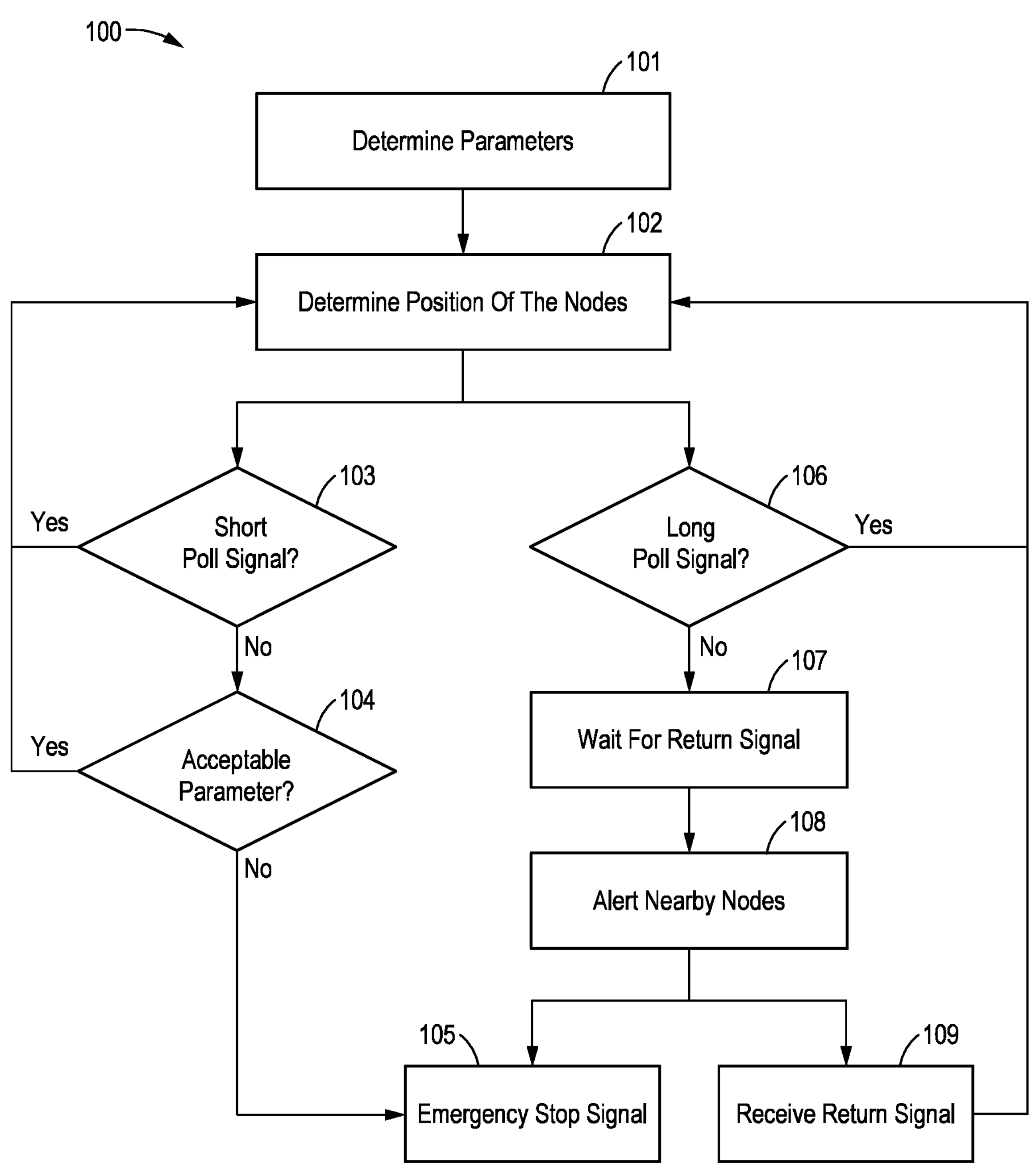
FIG. 4 is a flowchart depicting a sample sequence of steps for monitoring a plurality of nodes which may be practiced in accordance with the present disclosure.

FIG. 4 illustrates a visual representation of a method 100 for monitoring a plurality of nodes. In the exemplary embodiments as shown in FIGS. 2-3, the nodes may include the work machine 10, the work site equipment 20, and the worker 30, among others on a work site. In a first step 101, the controller 42 of the node monitoring system 40 determines parameters for operation. In the example of the embodiments of FIGS. 2-3, the parameters may include defining any number of operations zones and their boundaries, defining an acceptable proximity between the nodes, and defining what deviation from parameters is nonetheless deemed acceptable. The first step 101 may also include defining the time period between each request of both the short poll signal 44 and the long poll signal 45.

The node monitoring system 40 determines the position of each of the nodes tracked by the controller 42. In a second step 102, the controller 42 simultaneously sends the short poll signal 44 and the long poll signal 45 to each of the plurality of nodes. For each of the nodes, the controller 42, in a second step 103, determines if an acceptable return has been received. If so, the short poll signal 44 is sent again after a defined period of time. If not, in a fourth step 104, the controller 42 determines if the node is operating within an acceptable parameter deviation as defined in the first step 101. For example, in the embodiment of FIG. 3, the work machine 10 may be operating outside the first boundary 51 of the first operation zone 50. However, the work machine 10 of FIG. 3 is travelling between the first operation zone 50 and the second operation zone 52 under a normal operating condition. While the short poll signal 44 is returned with a non-positive response, the return is otherwise acceptable, and the short poll signal 44 is sent again after the defined period of time. If the return is not acceptable, in a fifth step 105, the controller 42 prompts the node to activate the emergency stop. Where the node is the work machine 10, the controller 42 may remotely activate the emergency stop, an operator may activate the emergency stop, or the worker 30 may activate the emergency stop.

The long poll signal 45 is simultaneously sent to the nodes as the short poll signal 44. In a sixth step 106, the controller 42 determines if an acceptable return has been received for the long poll signal 45. If so, as with the short poll signal 44, the long poll signal 45 is sent again after a defined period of time. If not, the controller 42, in a seventh step 107, may be prompted to wait for the signal for a defined period of time. This defined wait time may be defined in the parameters of the first step 101. In an eighth step 108, the controller 42 may alert any nearby nodes that a positive return from the long poll signal 45 has not been received from the node.

In a ninth step 109, the long poll signal 45 may eventually be returned to the controller 42 within the wait time parameter. For example, in the embodiment of FIG. 3, once the work machine 10 travelling between operation zones arrives at the destination zone, the long poll signal 45 is returned to the controller 42. If the long poll signal 45 is not returned within the wait time parameter, the controller 42 prompts the node to activate the emergency stop.

The method 100 for monitoring a plurality of nodes describes operation of the node monitoring system 40 of the primary embodiment, and how in operation, the node monitoring system 40 may dynamically manage fleets of vehicles, equipment, and personnel. The node monitoring system 40 allows an understanding of what specific nodes are being shut down when an emergency stop is being pressed, as well as shutting down vehicles that unexpectedly go out of a defined range. Simultaneously providing the short poll signal 44 and the long poll signal 45 allows for optimization of bandwidth of the short poll signal 44, while also providing acceptable operation deviations that are tracked by the long poll signal 45.

The node monitoring system 40 can be adapted to any work site, and can solve problems of vehicles going out of a defined range without a need for physical fixed infrastructure. The node monitoring system 40 can also be adapted to other industries that utilize fleets of vehicles, movable equipment, and workers that may interact with them.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A work site monitoring system, comprising:

a plurality of work site nodes, each of the plurality of work site nodes registered and connected with a controller and configured to:

receive both a short poll signal and a long poll signal from the controller;

send a return short poll signal to the controller in response to receiving the short poll signal; and send a return long poll signal to the controller in response to receiving the long poll signal; and the controller configured to:

register an area as an operation zone having a boundary;

send the short poll signal and the long poll signal to and from each of the plurality of work site nodes;

receive the return short poll signal and the return long poll signal from each of the plurality of work site nodes;

in response to a failure to receive the return short poll signal from at least one of the plurality of work site nodes, command the at least one of the plurality of work site nodes to power off; and in response to a failure to receive the return long poll signal from a work site node of the plurality of work site nodes, alert others of the plurality of work site nodes that the work site node is operating outside of a spatial boundary.

2. The node monitoring system of claim 1, wherein the operation zone having the boundary includes multiple operation zones each having a zone boundary.

3. The node monitoring system of claim 1, wherein the plurality of work site nodes includes a portable transmitter and receiver configured to be worn by a person.

4. The node monitoring system of claim 1, wherein the plurality of work site nodes includes a vehicle having a control module with a transmitter and a receiver.

5. The node monitoring system of claim 4, wherein the vehicle is operator controlled.

6. The node monitoring system of claim 4, wherein the vehicle is remote controlled.

7. The node monitoring system of claim 4, wherein the vehicle is an autonomous vehicle.

* * * * *